(12) United States Patent
Langhorne et al.

(10) Patent No.: US 12,481,170 B2
(45) Date of Patent: Nov. 25, 2025

(54) ACTUATOR ASSEMBLY

(71) Applicant: CAMBRIDGE MECHATRONICS LIMITED, Cambridge (GB)

(72) Inventors: Robert Langhorne, Cambridge (GB);
Robin Eddington, Cambridge (GB);
James Howarth, Cambridge (GB);
Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 351 days.

(21) Appl. No.: 18/265,112

(22) PCT Filed: Dec. 6, 2021

(86) PCT No.: PCT/GB2021/053187
§ 371 (c)(1),
(2) Date: Jun. 2, 2023

(87) PCT Pub. No.: WO2022/118048
PCT Pub. Date: Jun. 9, 2022

(65) Prior Publication Data
US 2024/0026866 A1    Jan. 25, 2024

(30) Foreign Application Priority Data
Dec. 4, 2020    (GB) .................................... 2019166

(51) Int. Cl.
*G02B 27/64* (2006.01)
*F03G 7/06* (2006.01)
(Continued)

(52) U.S. Cl.
CPC ....... *G02B 27/646* (2013.01); *F03G 7/06143* (2021.08); *G02B 7/09* (2013.01);
(Continued)

(58) Field of Classification Search
None
See application file for complete search history.

(56) References Cited

U.S. PATENT DOCUMENTS

| | | | |
|---|---|---|---|
| 8,073,320 B2 * | 12/2011 | Topliss ..................... | G03B 3/10 396/133 |
| 8,446,475 B2 * | 5/2013 | Topliss ..................... | G03B 3/10 348/374 |

(Continued)

FOREIGN PATENT DOCUMENTS

| | | |
|---|---|---|
| JP | 2012-227998 A | 11/2012 |
| JP | 2014-010380 A | 1/2014 |
| WO | 2018/206768 A1 | 11/2018 |

OTHER PUBLICATIONS

Examination and Search Report of GB Application GB2019166.4 dated May 10, 2023, pp. 6.
(Continued)

*Primary Examiner* — Derek S. Chapel
(74) *Attorney, Agent, or Firm* — Van Hoven PC; Stefan D. Osterbur; Joshua Van Hoven

(57) ABSTRACT

A shape memory alloy (SMA) actuator assembly comprising: a support structure (211); a moveable part (213) moveable relative to the support structure; at least one SMA wire (202) having a first portion and a second portion respectively attached to the support structure and the moveable part, the said SMA wire is configured to, on contraction, drive movement in the moveable part at least in a primary axis along which the shortest side of the SMA actuator assembly extends; an intermediate component (220) engaging the SMA wire at a location between the first and second portions, the second portion of the SMA wire being arranged at an oblique angle to both the primary axis and the first portion of the SMA wire.

20 Claims, 10 Drawing Sheets

(51) Int. Cl.
    *G02B 7/09*     (2021.01)
    *G02B 13/00*     (2006.01)
    *G03B 3/10*     (2021.01)
    *G03B 5/00*     (2021.01)
    *G03B 13/36*     (2021.01)
    *G03B 30/00*     (2021.01)

(52) U.S. Cl.
    CPC ............ *G02B 13/001* (2013.01); *G03B 3/10* (2013.01); *G03B 5/00* (2013.01); *G03B 13/36* (2013.01); *G03B 30/00* (2021.01); *G03B 2205/0007* (2013.01); *G03B 2205/0076* (2013.01)

(56) References Cited

U.S. PATENT DOCUMENTS

| | | |
|---|---|---|
| 2011/0249131 A1 | 10/2011 | Topliss et al. |
| 2011/0279916 A1* | 11/2011 | Brown ................ F03G 7/06143 359/823 |
| 2012/0019675 A1 | 1/2012 | Brown |
| 2013/0222685 A1 | 8/2013 | Topliss et al. |
| 2020/0386968 A1* | 12/2020 | Uno ......................... G03B 5/02 |
| 2023/0048232 A1* | 2/2023 | Carr .................... F03G 7/06143 |
| 2023/0400702 A1* | 12/2023 | Eddington ........... G02B 27/646 |
| 2025/0059959 A1* | 2/2025 | Bunting .................. G02B 7/09 |

OTHER PUBLICATIONS

International Search Report and Written Opinion received for PCT Patent Application No. PCT/GB2021/053187, mailed on Apr. 4, 2022, 17 pages.

\* cited by examiner

ACTUATOR ASSEMBLY

CROSS-REFERENCE TO RELATED APPLICATIONS

This application is a national stage application under 35 U.S.C. § 371 of International Application No. PCT/GB2021/053187, filed Dec. 6, 2021, which claims priority of GB Patent Application No. 2019166.4, filed Dec. 4, 2020, the disclosures of each of which are hereby incorporated by reference herein in their entireties.

FIELD

The present application relates to an actuator assembly, particularly an actuator assembly comprising one or more shape-memory alloy (SMA) wires.

BACKGROUND

WO 2011/104518A1 describes an actuator assembly that uses SMA wires to move a moveable part supported on a support structure. For example, to provide optical image stabilisation and/or autofocus (AF). In this example, eight SMA wires are arranged inclined with respect to a notional primary axis (or an optical axis) with a pair of the SMA wires on each of four sides around the primary axis. The SMA wires are connected so that on contraction two groups of four SMA wires provide a force with a component in opposite directions along the primary axis to effect movement along the primary axis. The SMA wires of each group have 2-fold rotational symmetry about the primary axis so that SMA wires are opposing each other to effect lateral movement.

SUMMARY

Current smartphone cameras trend towards larger diameter lenses for achieving better imaging performance. However, the use of larger and heavier lenses requires the use of larger actuator assemblies to accommodate the larger footprint of the lenses. In addition, the increase in lens size calls for an increase in both movement stroke and power output.

In prior art actuator assemblies, for example, WO 2011/104518A1, the height of the actuator typically increases with its footprint. This is because there is a 'minimum wire angle' that the actuator needs to prevent uncontrolled resonance in the SMA wires along the optical axis. Therefore, such design may be unfavourable for supporting larger lenses as the height (or thickness) of the actuator assembly is at a premium in smartphone cameras.

In summary, the present invention permits the height of an actuator assembly to be decoupled from the footprint to accommodate larger lenses. Thus, it allows mobile electronic devices to meet demanding height requirements. Additionally, it may offer greater flexibility to exchange optical image stabilisation (OIS) stroke for autofocus (AF) stroke and vice versa within a given space envelope.

According to a first aspect of the present embodiment, there is provided a shape memory alloy (SMA) actuator assembly comprising:
a support structure;
a moveable part moveable relative to the support structure;
at least one SMA wire having a first portion and a second portion respectively attached to the support structure and the moveable part, the said SMA wire is configured to, on contraction, drive movement in the moveable part at least in a primary axis along which the shortest side of the SMA actuator assembly extends; an intermediate component engaging the SMA wire at a location between the first and second portions, the second portion of the SMA wire being arranged at an oblique angle to both the primary axis and the first portion of the SMA wire.

The SMA actuator assembly may be a micro-actuator for a camera assembly or a mobile phone. The moveable part may comprise a lens having an optical axis along the longitudinal axis, wherein the SMA actuator assembly provides one or more of: optical image stabilisation (OIS), autofocus (AF), and zoom for the camera assembly.

The SMA actuator assembly may comprise one or more (e.g. elongate) SMA wires and may connect the moveable part (e.g. a lens carriage) directly, or by a flexure. In the latter, the motion caused by a contraction in the SMA wires may be transferred through the flexure.

The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The SMA wire may form from any suitable shape memory alloy material, typically a nickel-titanium alloy (e.g. Nitinol), but they may also contain tertiary components such as copper. The SMA wires may have any cross-sectional profile and diameter suitable for the application. For example, the SMA wires may each having a cross-section diameter of 25 μm, or 30 μm, or 35 μm, capable of generating a maximum force of between 120 mN to 400 mN whilst maintaining the strain in the SMA wire within safe limits (e.g. 2-3% reduction in length over original length). Increasing the diameter of each SMA wire from 25 μm to 35 μm approximately doubles the cross-sectional area of the SMA wire and thus approximately doubles the force provided by each SMA wire.

The first portion and the second portion of the SMA wire are respectively attached to the support structure and the moveable part, wherein such an attachment may be achieved by any suitable means known to the person skilled in the art, for example welding, adhesive, and crimping.

The shortest side of the SMA actuator assembly extends along the primary axis. More specifically, the SMA actuator assembly may comprise three axes and the primary axis may be defined along the smallest dimension of the SMA actuator assembly. Therefore, the SMA actuator assembly may be at its thinnest in the primary axis.

The second portion of the SMA wire may be arranged at an oblique angle to both the primary axis and the first portion of the SMA wire. That is, the second portion of the SMA wire may be arranged neither parallel, nor at a right angle to the first portion of the SMA wire and the primary axis.

The intermediate component is configured to engage, or support, the SMA wire at a location between the first and second portions. Thus, by the support offered by the intermediate component, an oblique angle is formed between the two portions.

The SMA wire is configured to, on contraction, drive movement in the moveable part at least in a primary axis. However, the SMA wire may also configured to drive movement in the moveable part in other directions, for example in a direction perpendicular to the primary axis.

The at least one SMA wire may comprise a pair of SMA wires, four SMA wires arranged individually or in pairs, or eight SMA wires arranged individually or in groups of four. Preferably, the plural SMA wires are evenly distributed around the four sides of the moveable part. Preferably, the SMA wires are arranged with two-fold or four-fold symmetric around the optical axis. Optionally, the said SMA wire is configured to, on contraction, drive movement in the moveable part additionally in a direction perpendicular to the primary axis. Therefore, when eight SMA wires are employed in the SMA actuator assembly (similar to the actuator assembly as disclosed in WO 2011/104518A1), together they are configured to direct movement in the moveable part in any direction.

Optionally, the second portion extends at a smaller angle than that of the first portion with respect to the primary axis. Advantageously, such an arrangement may allow the second portion of SMA wire, attached to the moveable part, to be arranged at an angle greater than a 'minimum wire angle' that is sufficient to prevent uncontrolled resonance along the optical axis, regardless of the dimension of the actuator. The 'minimum wire angle' may be at least 8 degrees, or at least 10 degrees, to either the primary axis or an axis perpendicular to the primary axis. More specifically, whilst increasing the footprint of the actuator, an increase in SMA wire length only lengthens a laterally extending (or slightly inclined) first portion. The second portion may be maintained at the same angle as, or at a sharper angle than, a known actuator such as that disclosed in WO 2011/104518A1, even the total length of the SMA wire is lengthened.

Optionally, the extent of the second portion is greater than that of the first portion along the primary axis. Therefore advantageously, lengthening the first portion of SMA wire may not significantly increase the height of the actuator.

Optionally, the first portion is longer in length than the second portion. Therefore advantageously, the length of the SMA a wire may be decoupled from the height of the actuator.

Optionally, the first portion extends substantially perpendicular to, or at an acute angle relative to, the primary axis. For example, when a pair of opposing SMA wires are provided to drive the moveable part in opposite directions, their respective first portions may extend parallel to each other. Thus, advantageously such an arrangement may prevent the SMA wires from crossing each other when viewed from a direction perpendicular to the primary axis, thereby reducing the risk of contact or rubbing between the SMA wires.

Optionally, the intermediate component extends from the support structure. For example, the intermediate component may be a post protruding from a base of the actuator assembly and extends along the primary axis. More specifically, the intermediate component defines the border between the first portion and the second portion, thereby causes misalignment between the first portion and the second portion. In embodiments with plural SMA wires, there may be one intermediate component provided for each of the SMA wires, or there may be a single intermediate component for all of the SMA wires.

Optionally, the intermediate component comprises an end stop for defining the range of movement in the moveable part in a direction perpendicular to the primary axis. For example, as the intermediate component extends from the support structure, it may additionally serve as an end stop defining the movement range of the moveable part. Advantageously, such an arrangement may not require an additional part for forming the intermediate component, as it uses an end stop that may nevertheless present in an actuator.

Optionally, the SMA wire is slidingly supported on the support component, alternatively optionally by a roller. More specifically, the support component may comprise a roller or a hook for supporting the SMA wire. For example, the SMA wire may slide, along its length, on the roller or the hook, thereby changing the respective length (or ratio) of the first and second portion accordingly. Advantageously, such an arrangement may reduce the friction between the SMA wire and the support structure.

Optionally, the support component comprises a flexure for supporting the SMA wire, wherein the flexure is compliant along a plane in which the SMA wire extends. For example, the SMA wire may be fixedly attached to an end of the flexure. Upon contraction, the end of the flexure may pivot about its fixing point at the support structure. Advantageously, the flexure may allow the moveable part to return to a default position once an unenergized SMA wire is cooled down.

Optionally, the extent of contraction in the SMA wire is substantially less than the displacement of the moveable part. For example, the flexure may amplify the movement (or stroke) of the moveable part with a given length of SMA wire.

Optionally, the flexure extends at a non-zero angle to the first portion of the SMA wire, wherein the said angle determines the displacement achievable by the SMA wire. For example, a smaller angle between the first portion of the SMA wire and the flexure may result in greater displacement in the moveable part, which is particularly useful in zoom applications. The said adjustment may be effected manually or it may be controlled by the controller, or it may be set during the manufacturing process to suit the type of camera the actuator is being installed.

According to a second aspect of the present invention, there is provided a shape memory alloy (SMA) actuator assembly comprising:

first and second parts that are moveable relative to each other; and one or more actuating units, each actuating unit comprising:

a force-modifying mechanism connected to the first part;

a coupling link connected between the force-modifying mechanism and the second part; and an SMA wire connected between the first part and the force-modifying mechanism for applying an input force on the force-modifying mechanism thereby causing the force-modifying mechanism to apply an output force on the coupling link and causing the coupling link to apply an actuating force on the second part, wherein the coupling link is compliant in a direction perpendicular to the direction of the actuating force; and wherein the one or more actuating units are arranged (or wherein the SMA wire is arranged) to drive movement of the second part relative to the first part at least along a primary axis along which the shortest side of the SMA actuator assembly extends.

Preferably, the first part comprises a support structure and the second part comprises a moveable part. The force-modifying mechanism may be embodied by a flexure arrangement, wherein the coupling link may be embodied by a flexure arm.

Optionally, the SMA wire is arranged at a non-zero angle to the primary axis.

In comparison to the embodiments of the first aspect of the invention, the second portion of the SMA wire may be replaced by the force-modifying mechanism according to the second aspect. Advantageously, the use of the force-modifying mechanism may decouple the length of the SMA wire from the overall height of the actuator assembly, by allowing the SMA wire to extend in a direction substantially perpendicular to the primary axis, or at least inclined at a shallower angle compared to known actuator assemblies.

Optionally, the force-modifying mechanism is configured such that, in response to a change in length of the SMA wire, the end of the SMA wire that is connected to the force-modifying mechanism moves relative to the first part by a first distance, and the end of the coupling link that is connected to the force-modifying mechanism moves relative to the first part by a second distance that is greater than the first distance. More generally, the second distance is greater than the change in length of the SMA wire. Such an arrangement may be used to amplify the stroke achievable by the SMA actuator assembly.

Alternatively, the force-modifying mechanism is configured such that, in response to a change in length of the SMA wire, the end of the SMA wire that is connected to the force-modifying mechanism moves relative to the first part by a first distance, and the end of the coupling link that is connected to the force-modifying mechanism moves relative to the first part by a second distance that is smaller than the first distance. More generally, the second distance is smaller than the change in length of the SMA wire. For example, such an arrangement may be configured to increase the applicable actuating force with a given input force by the SMA wire.

Broadly speaking, in some embodiments the second aspect uses the force-modifying mechanism as a lever to amplify, or at least modify, the displacement of the second part achievable by a given amount of SMA wire contraction. Additionally, or alternatively, through rotation in at least part of the force-modifying mechanism, the present embodiment may reduce the length of SMA wire required to achieve a required stroke. Therefore, such an arrangement may provide a more compact, as well as a more energy-efficient SMA actuator assembly.

In some embodiments, the coupling link may be considered as the component primarily responsible for transferring the actuating force to the second part. The coupling link may be embodied by any element or arrangement capable of fulfilling the dual function of transferring an actuating force to the second part and providing compliance in a direction perpendicular to the direction of the actuating force.

Optionally, the coupling link is or comprises a flexure. The flexure may be elongate and may be stiff along its length and compliant in a direction perpendicular to its length. That is, the coupling link may be referred to as a flexure arm which is configured to bend easily in the movement plane, in particular in the direction orthogonal to the actuating force, but may be stiff or non-compliant in other directions.

In some embodiments, in at least one actuating unit, the SMA wire may be connected to the first part at or near one corner of the actuator assembly and connected to the force-modifying mechanism at or near an adjacent corner of the actuator assembly.

In some embodiments, in at least one actuating unit, the coupling link may include at least one bend. The bend may be a hairpin bend, e.g. of 180°.

In some embodiments, in at least one actuating unit, the force-modifying mechanism may be configured such that, when the SMA wire is in tension, the coupling link is in compression.

Optionally, the coupling link may be configured to apply a lateral biasing force on the second part, so as to return the second part to and/or retain the second part at a default (or central) position. This may be achieved, in particular, in embodiments in which the coupling link comprises a flexure.

Optionally, the coupling link may constrain movement of the second part in a direction perpendicular to the direction of the actuating force. For example, in embodiments in which the first or second part comprises a lens or an image sensor, the coupling link may constrain movement along or parallel to the optical axis. With regard to an image sensor, the optical axis may be considered to be an axis perpendicular to the light-sensitive surface of the image sensor. The coupling link may be a preformed flexure arm that constrains movement in directions perpendicular to the primary axis.

Alternatively, the coupling link may be a rigid member, such as a rod, with pin joints that allow the coupling link to pivot in the movement plane. For example, the pivot may be a post extending from the force modifying mechanism and hingedly attached to one of the first part and the second part, in particular to the first part. Advantageously, such an arrangement may allow precise control of the displacement in the second part. In some other embodiments, the pivot may be a post extending from the first part or the second part and in contact with the force modifying mechanism, and upon energising the SMA wire, the force modifying mechanism may be configured to roll on the surface of the post. In such embodiments, the pivot forms part of a class 1 lever system to increase the displacement of the second part.

Alternatively, the coupling link may comprise a rolling bearing, such as a roller bearing or a ball bearing. The rolling bearing may comprise a rolling element, such as a roller or ball, bearing on respective bearing surfaces of the movable part and of the force-modifying mechanism. The rolling bearing is thus connected between the movable part and the force-modifying mechanism, and arranged to apply an actuating force on the movable part via the rolling element. The rolling bearing achieves compliance in a direction perpendicular to the direction of the actuating force by allowing rolling of the rolling element perpendicular to the actuating force. The bearing surfaces may be arranged to be orthogonal to the actuating force.

Further alternatively, the coupling link may comprise a plain bearing. The plain bearing may also be referred to as a sliding bearing. The plain bearing comprises a bearing surface on the movable part and a complementary bearing surface on the force-modifying mechanism, wherein the two bearing surfaces are slidable relative to each other. The plain bearing is thus connected between the movable part and the force-modifying mechanism by virtue of comprising complementary surfaces on these components and arranged to apply an actuating force on the movable part via the bearing surfaces. The plain bearing achieves compliance in a direction perpendicular to the direction of the actuating force by allowing relative sliding of the bearing surfaces. The bearing surfaces may be arranged to be orthogonal to the actuating force. The plain bearing may comprise a friction-reducing material, such as a liquid or solid lubricant, between the bearing surfaces.

In operation, the coupling link may be generally in tension. The force-modifying mechanism may pull on the movable part via the coupling link so as to apply the actuating force to the movable part. This is particularly preferable, for example, when the coupling link comprises a flexure. The end of the coupling link that is connected to the second part may be fixed relative to the second part. The actuating force may be in substantially the same direction as the output force.

Alternatively, the coupling link may be generally in compression. The force-modifying mechanism may push on the movable part via the coupling link so as to apply the actuating force to the movable part. This is particularly preferable, for example, when the coupling link comprises a rolling bearing or plain bearing.

Optionally, the force-modifying mechanism comprises:
a moveable portion to which the SMA wire and the coupling link are connected; and
a force-modifying flexure connected between the moveable portion and the first part and configured to bend in response to the input force.

The moveable portion may be referred to as a flexure body.

Optionally, for example in embodiments in which the force-modifying mechanism and the coupling link comprise flexures, at least one of the coupling link and force-modifying flexure is configured to have a lower stiffness in a direction along the primary axis than any other directions to facilitate the movement of the moveable portion.

Optionally, for example in embodiments in which the force-modifying mechanism comprises a flexure, the force-modifying flexure is elongate and is stiff along its length and compliant in a direction perpendicular to its length.

Optionally, two or all of the moveable portion, coupling link, and force-modifying flexure may be formed separately. In embodiments, the force-modifying flexure may be formed from the same or different material to the coupling link and/or force-modifying flexure. For example, the moveable portion may be rigid or at least have a higher stiffness than the coupling and/or the force-modifying flexure. In embodiments, the moveable portion may be attached to the coupling link and/or force-modifying flexure by any suitable attaching means, such as welding, adhesive and mechanical means. Alternatively, the moveable portion is integrally formed with the force-modifying flexure and/or the coupling link. Advantageously, such an arrangement may result in a more efficient manufacturing process, as well as a lower production cost.

Optionally, the at least one SMA wire comprises a first SMA wire and a second SMA wire configured to drive movement in the moveable part or second part respectively in a first direction and a second direction opposite to the first direction.

Optionally, the at least one SMA wire comprises four pairs of SMA wires, wherein the four pairs of SMA wires are arranged with two-fold symmetry, for example two-fold rotational symmetry, around the primary axis.

Optionally, the moveable part or second part comprises one or more lenses. The primary axis may be the optical axis of the one or more lenses. For example, when supported on the moveable part or second part, the one or more lenses may be moveable relative to an image sensor on the support structure or first part.

Optionally, the moveable part or second part comprises an image sensor. The primary axis may be an axis perpendicular to a light-sensitive region of the image sensor. The image sensor may be moveable relative to one or more lens that are supported on another moveable part or second part, or on the support structure or first part.

Features from the first aspect of the present invention may combine with any feature in the second aspect.

BRIEF DESCRIPTION OF THE DRAWINGS

Certain embodiments of the present invention will now be described, by way of example only, with reference to the accompanying drawings, in which.

DETAILED DESCRIPTION

Figure 1:
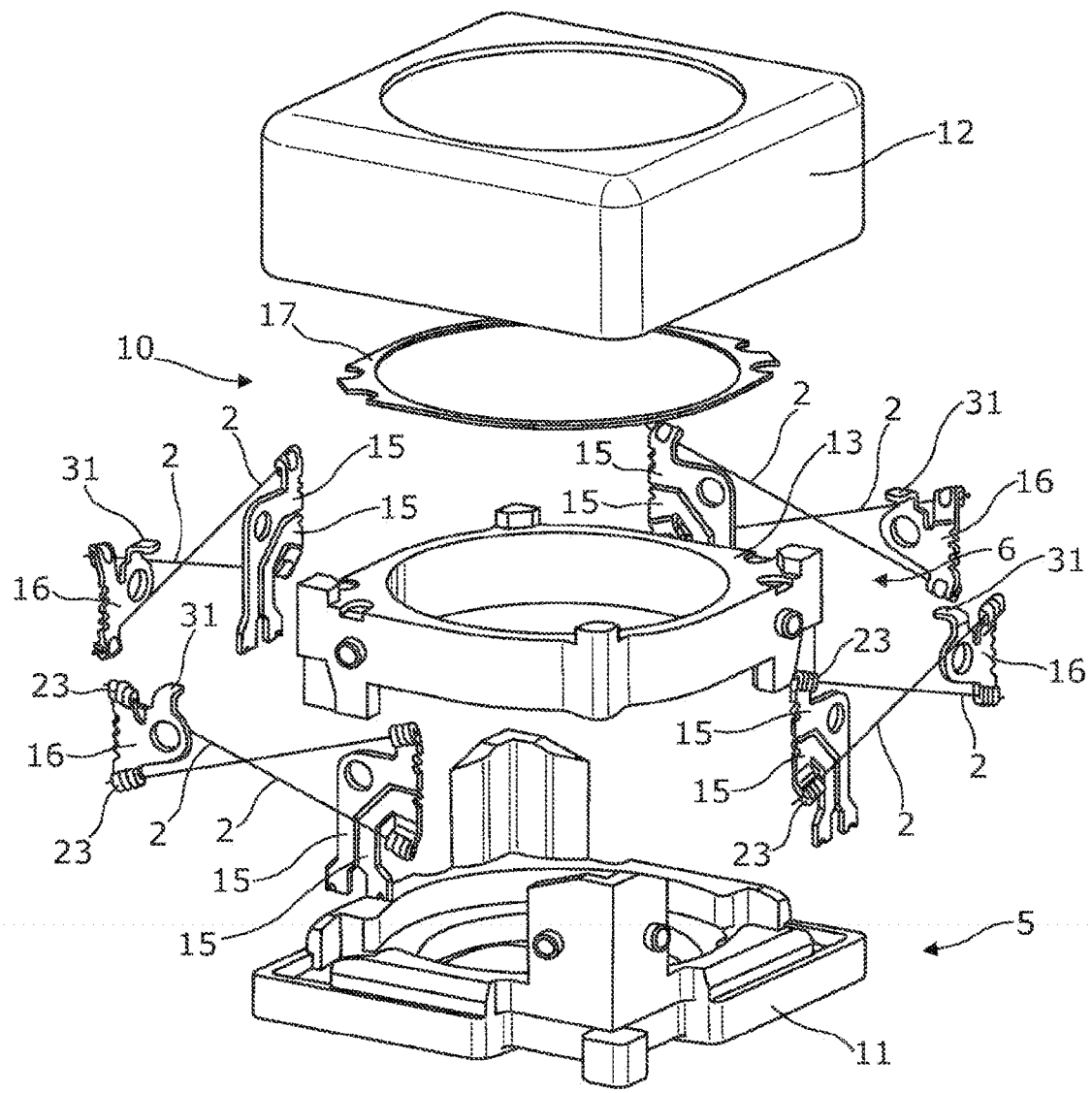
FIG. 1 is an exploded view of a known SMA actuator wire arrangement in a camera.

FIG. 1 shows an exploded view of a known shape memory alloy (SMA) actuator wire arrangement 10 in a miniature camera. The SMA actuator arrangement 10 includes a support structure 5 that comprises a support structure 11 that is an integrated chassis and sensor bracket for mounting an image sensor, and a screening can 12 attached to the support structure 11. The SMA actuator arrangement 10 includes a moveable part 6, which is a camera lens assembly comprising a lens carriage 13 carrying at least one lens (not shown).

In some other embodiments, the support structure 11 may comprise a camera lens assembly comprising a lens carriage 13 carrying at least one lens (not shown), wherein the moveable part 13 may comprise a sensor bracket for mounting an image sensor. That is, in these alternative embodiments, the image sensor is moveable relative to (fixed or moveable) lenses.

In this example, the actuator 10 includes eight SMA wires 2 each attached between the static part 5 and the moving part 6. A pair of SMA wires 2 that cross each other are provided on each of four sides of the SMA actuator arrangement 10 as viewed along an optical axis, along a first direction. The SMA wires 2 are attached to the static part 5 and the moving part 6 in such a configuration that upon heating, they contract and thereby provide relative movement of the moving part 5 with multiple degrees of freedom for providing both autofocus (AF) and optical image stabilisation (OIS).

Thus, in respect of each pair of SMA wires 2, the SMA wires 2 are attached at one end to two static mount portions 15, which are themselves mounted to the static part 5 for attaching the SMA wires 2 to the static part 5. The static mount portions 15 are adjacent to one another but are separated to allow them to be at different electrical potentials.

Similarly, in respect of each pair of SMA wires 2, the SMA wires 2 are attached at one end to a moving mount portion 16 which is itself mounted to the moving part 6 for attaching the SMA wires 2 to the moving part 6. The moving part 6 further comprises a conductive ring 17 connected to each of the moving mount portions 16 for electrically connecting the SMA wires 2 together at the moving part 6.

The static mount portions 15 and the moving mount portions 16 comprise crimp tabs 23 which may be formed into crimps and used to hold the SMA wires 2. The moving mount portions 16 may comprise electrical connection tabs 31 for providing electrical connection to the conductive ring 17. Thus, in the example shown in FIG. 1, the crimp tabs 23 that are formed into crimps are integral parts of the static and moving portions of the actuator arrangement 10. Methods for forming the crimps and trapping the SMA wires within the crimp tabs 23 are described in International Patent Publication No. WO2016/189314.

The SMA wires 2 are connected so that on contraction two groups of four SMA wires 2 provide a force with a component in opposite directions along the primary axis to effect movement along the primary axis. The SMA wires of each group have 2-fold rotational symmetry about the primary axis so that SMA wires are opposing each other to effect lateral movement.

As shown in FIG. 1, a pair of the SMA wires 2 are provided on each of four sides around and extend at an angle to, the optical axis. There is a 'minimum wire angle' that the actuator needs to prevent uncontrolled resonance in the SMA wires 2 along the optical axis. Therefore, to maintain such a wire arrangement and to prevent the said uncontrolled resonance, the height of the actuator typically increases during scale-up. Therefore, such a known design may be unfavourable for larger lenses if the height (or thickness) of the actuator assembly is at a premium.

In practice, when the SMA wires 2 are unenergized, i.e. when the SMA actuator 10 is powered off and the SMA wires have sufficiently cooled down, they may no longer be under tension. Thus, in most cases, a degree of slack may be observed in the unenergized SMA wires 2. This may cause free movement in the SMA wires, as well as in the lens carriage. Since the SMA wires 2 are crossed as viewed from the side, such free movement may cause the SMA wires to contact and rub over each other, leading to extensive abrasion and wear of the wires.

The present invention provides various means for decoupling the footprint and the height of an actuator. In some embodiments, the present invention may reduce or eliminate wires abrasion. The means may be applied together or each on their own, wherein the means may apply to any SMA actuator arrangement having inclined SMA wires.

Figure 2:
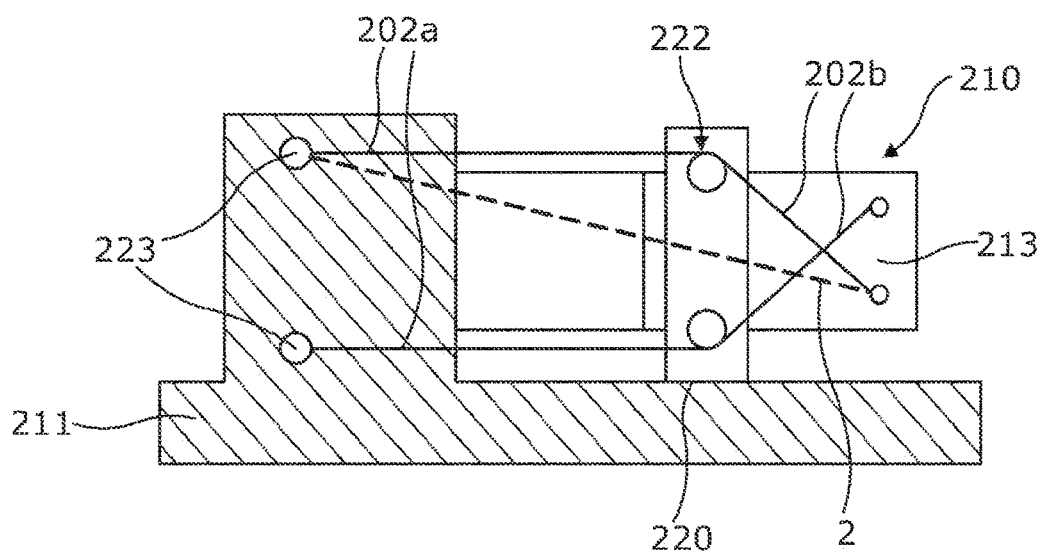
FIG. 2 is a side view of an SMA actuator according to a first embodiment of the present invention.

FIG. 2 shows an SMA actuator 210 according to a first embodiment of the present invention. As viewed from the side of the actuator 210, there is provided a pair of SMA wires 202 connecting the moveable part 213 and the base 211. For the ease of comparison, an SMA wire 2 as used in the known embodiment of FIG. 1 is also shown in dotted lines.

In FIG. 2, it is shown that the pair of SMA wires 202 are supported, or at least interfered, by respective rollers 222. The rollers 222 are provided on a support component 220 that extends from the support structure 211 and in a direction along the optical axis O. The rollers 222 are freely rotatable relative to the support component 220. Thus, they serve to reduce friction, as well as wear, in the SMA wires 202 as they slide relative to the support component 220.

In some embodiments, the rollers may be replaced by non-rotatable supports. That is, in these embodiments, the SMA wires may directly slide on the contacting surfaces of their respective non-rotatable supports, such as a hook. To reduce friction and wear, the contacting surfaces may be provided with a sacrificial coating and/or friction-reducing means such as a polymer coating, a polished surface, a lubricant, or any other suitable friction-reducing means.

The support component 220 may be an additional component attached to the surface of the support structure 211 by known methods such as adhesion or mechanic connecting means. Preferably, as shown in FIG. 2, the support component 220 is integrally formed with the support structure 211. Advantageously, such an arrangement reduces the complexity of the manufacturing process, as well as improving the robustness of the support component 220.

The support component 220 may additionally serve as a lateral end stop for the moveable part 213. More specifically, the support component 220 defines the limit of lateral movement of the moveable part 213. For example, once the moveable part has reached such a limit, the support component 220 abuts its side surface and therefore ceases further movement in the movement direction. To reduce the noise, and to dampen an abrupt change of movement, the side surfaces of the moveable part 213 and/or the support component 220 may be provided with a suitable damper such as an elastomer layer, a foam, a damping gel, or any other suitable damper.

In the depicted embodiment, the rollers 211 are positioned at substantially the same level as their respective crimps 223 on the support structure 220. As such, a first portion of the SMA wire 202*a* extends in a direction substantially perpendicular to the optical axis. However, in some other embodiments, the rollers may be positioned at a different position to their respective crimps along the optical axis, and therefore SMA wires may be inclined with respect to the optical axis.

Because the SMA wires 202 are supported or interfered with by rollers 211, a second portion of the SMA wire 202*b* is arranged at an angle to the corresponding first portion 202*a*. Thus, the second portion of the SMA wire 202*a* is at least inclined with respect to the optical axis O. In comparison to the prior art SMA wire 2 as shown in the dotted line, the second portion of the wire 202b extends at a sharper angle relative the optical axis O. Thus, advantageously, such an arrangement is less susceptible to uncontrolled resonance in the SMA wires 202 than those featured in the known arrangement.

Thus, advantageously, the length of the SMA wires 202 is decoupled from the height of the SMA actuator 210. For example, when scaling up the SMA actuator 210, e.g. to accommodate larger and/or heavier lenses, only the first portions of the SMA wires 202a are lengthened (e.g. by increasing the separation of rollers 222 to their respective crimps 223) whilst maintain the length, as well as the wire angle, of the second portions of the SMA wires 202b, without the need of increasing the height of the SMA actuator.

Furthermore, the arrangement as shown in FIG. 2 allows the first portion of SMA wires 202 to extend substantially in parallel to each other. That is, first portions of the SMA wires 202a do not cross each other when viewed from the side of the actuator. More specifically, the longer portions of the SMA wires 202 that are more susceptible to slack do not cross. Advantageously, such an embodiment reduces the risk of abrasion damage, as well as short-circuiting between adjacent SMA wires 202 when they are unenergized.

In other embodiments, the first portions of the SMA wires 202 may not extend parallel to each other and may extend at an angle to and/or cross each other when viewed from the side of the SMA actuator. For example, the rollers 222 may not be at a position level with their respective crimps 223 and therefore the first portions of the SMA wires may be slightly inclined. Due to the arrangement of the angled wires in the first portions of the SMA wires, such embodiments may have a slightly reduced actuator footprint.

The SMA actuator 210 (and other SMA actuators according to this invention) comprises eight SMA wires 202 that are orientated and function similarly to the SMA actuator 10, e.g. the eight SMA wires 202 drive movement in the moveable part 213 in all directions. That is, together, the SMA wires 202 may move the movable part in a direction along the primary axis, or in a direction perpendicular to the primary axis, or any other directions.

The forces applied to the movable part by the eight SMA wires (or, in embodiments discussed further below, by the eight actuating units) of may be oriented or arranged in a manner equivalent to the orientation or arrangement of eight SMA wires in the prior art actuator described in relation to FIG. 1.

More specifically, the forces (e.g. when visualised as vectors at particular positions in space) are arranged on each of four sides (i.e. a first side, a second side, a third side and then a fourth side) around the primary axis. The two forces on each side are inclined in opposite senses with respect to each other, as viewed perpendicular from the primary axis. The four sides on which the forces are arranged extend in a loop around the primary axis. In this example, the sides are perpendicular and so form a square as viewed along the primary axis, but alternatively the sides could take a different e.g. quadrilateral shape. In this example, the forces are parallel to the outer faces of the square envelope of the moveable part 213 but this is not essential.

Four forces, including one force on each of the sides, form a 'first' group that have a component in one direction ('upwards') and the other four forces form a 'second' group that have a component in the opposite direction ('downwards'). Herein, 'up' and 'down' generally refer to opposite directions along the primary axis.

The forces have a symmetrical arrangement in which their magnitudes and inclination angles are the same, so that both the first group of forces and the second group of forces are each arranged with two-fold rotational symmetry about the primary axis.

As a result of this symmetrical arrangement, different combinations of the forces are capable of driving movement of the moveable part 213 with multiple degrees of freedom, as follows.

The first group of forces, when generated together, drive upwards movement, and the second group of forces, when generated equally, drive downwards movement.

Within each group, adjacent pairs of forces, when differentially generated, drive tilting about a lateral axis perpendicular to the primary axis z. Tilting in any arbitrary direction may be achieved as a linear combination of tilts about the two lateral axes.

Sets of four forces, including two forces from each group, when generated together, drive movement along a lateral axis perpendicular to the primary axis z. Movement in any arbitrary direction perpendicular to the primary axis z may be achieved as a linear combination of movements along the two lateral axes.

The SMA actuator may have other specific arrangements.

A control circuit can be electrically connected to the SMA wires for supplying drive currents thereto to drive these movements, e.g. as described in WO 2011/104518 A1 (which is incorporated by reference to the maximum extent permissible by law).

Figure 3A:
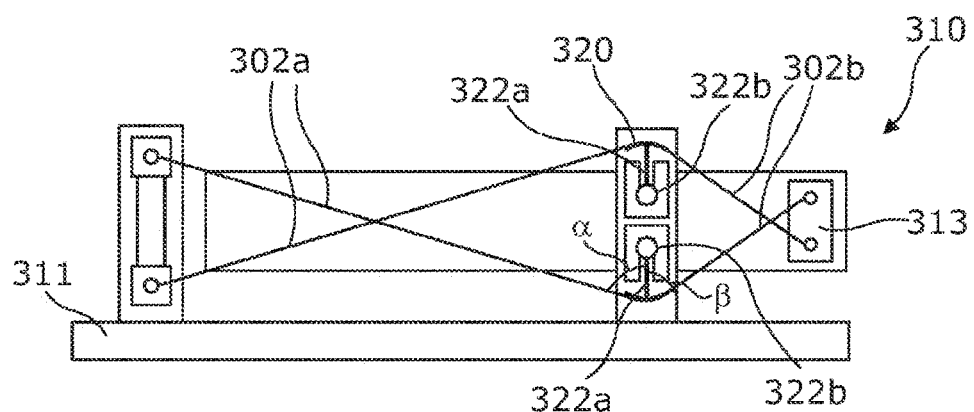
FIGS. 3A and 3B are respective side and plan views of an SMA actuator according to a second embodiment of the present invention.
Figure 3B:
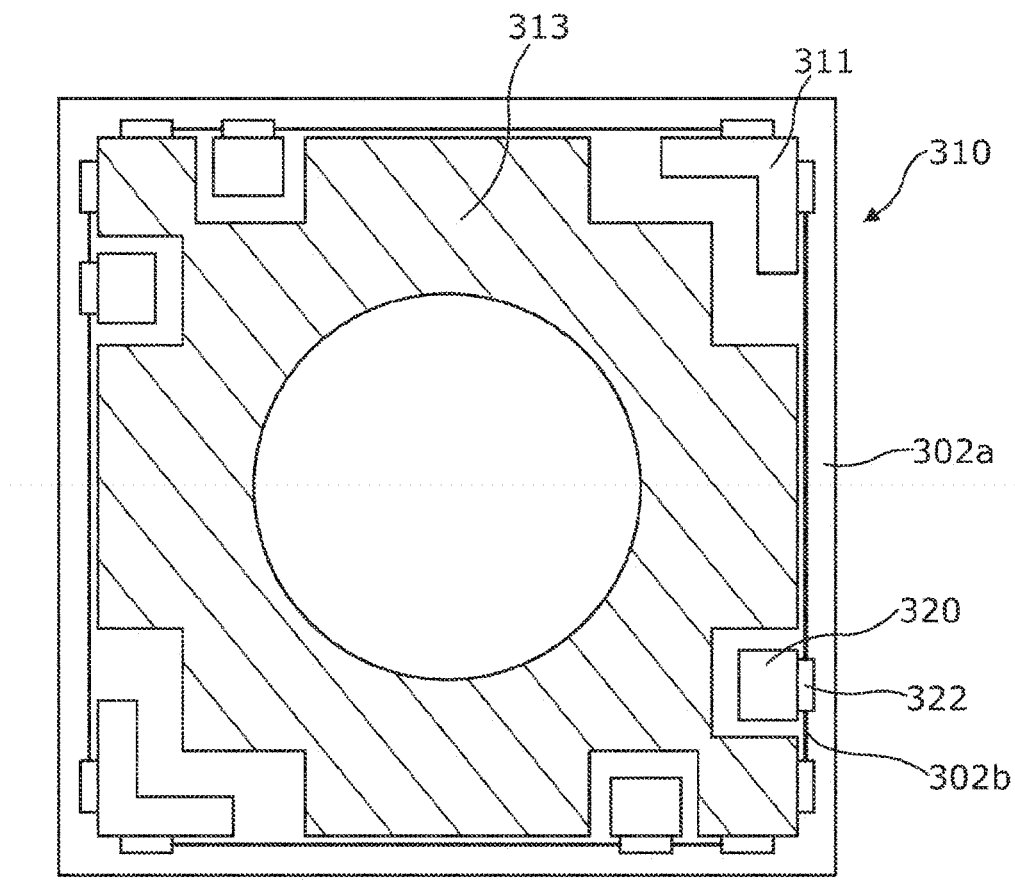

FIGS. 3A and 3B respectively show a side view and a plan view of an SMA actuator 310 according to a second embodiment of the present invention. As viewed from a side of the actuator 310, there is provided a pair of SMA wires 302 connecting the moveable part 313 and the base 311. As viewed from the plan view of the SMA actuator 310, there are four pairs of SMA wires 302 each provided on a respective side of the SMA actuator 310, wherein SMA wires 302 on opposing sides of the SMA actuator 310 may, on contraction, drive movement of the moveable part 313 in opposite directions.

In FIG. 3A, it is shown that a pair of SMA wires 302 is supported, or at least interfered, by flexures 322. In this embodiment, the SMA wires 302 in each part of SMA wires cross each other when viewed from the side, which reduces the footprint of the actuator. However, in other embodiments, SMA wires in some or each pair of SMA wires 302 may extend parallel to each other and substantially in a direction perpendicular to the optical axis, in a manner similar to the arrangement shown in FIG. 2.

The SMA wires 302 are fixedly attached to contacting surfaces of the flexures 332 by any suitable means, for example by adhesion or by mechanical means. Moreover, the tension in the SMA wires 302 compresses the flexures 332 towards their fixing points, which in turn helps to retain the SMA wires 302 on the contacting surface.

The flexures 322 comprise flexure arms 322a which are fixed, at respective fixing points 322b, to a support component 320 that extends from the support structure 311 along the optical axis O. Similarly to the first embodiment of FIG. 1, the support component 220 serves as an end stop for the moveable part 313, and defines the limit of lateral movement.

The flexures 322 are compliant only in a plane parallel to the optical axis O (e.g. X-Z or Y-Z planes) in which the SMA wires 302 extend, but not in any other direction. Thus, upon contraction, the force from the SMA wires 302 may compress the flexures 322, and deform or bend the flexure arms 322a towards the support component 220. That is, the ends of the flexures 322 rotate about their respective fixing points 322b. Advantageously, when the SMA wires 302 are not energised, the flexure arms 322a may bias the ends of the respective flexures 322 towards their default positions, so as to minimise the slack in the SMA wires 302. That is, the biasing force from the flexures 322 maintains tension in the SMA wires 302 at all times.

In a default position, e.g. when the SMA wires 302 are not energised, the flexure arms 322a extend substantially along the optical axis, with the first portions 302a and seconds portions 302b of the SMA wires respectively extending at angle α and β relative to their respective flexure arms 322a. Since the first portions of the SMA wires 402a in this embodiment are inclined at a steeper gradient in comparison to the second portions of the SMA wires 402b, angle α is greater than b.

The support component 320 may be an additional component attached to a surface of the support structure 311 by known methods such as by adhesive or mechanic connecting means. Preferably, as shown in FIG. 3A, the support component 320 is formed integrally with the support structure 311, and serves as an endstop for limiting lateral movement of the moveable part 313.

In some other embodiments, the SMA actuator 310 may comprise flexures with respective flexure arms directly attached to the support structure 311. That is, in these embodiments, the support component 320 may not be present, even though there may be endstops provided for limiting lateral movement of the moveable part 213. Advantageously, such an arrangement allows for longer flexure arms to be employed, and thereby is more suited for actuators requiring a greater displacement (e.g. stroke) of the moveable part.

Figure 4A:
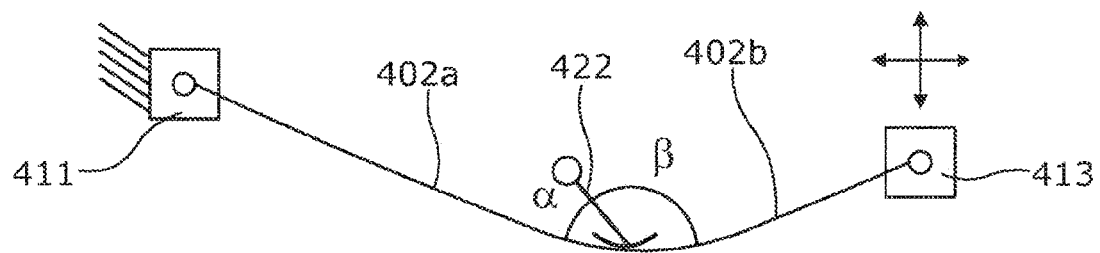
FIGS. 4A and 4B are side views of an SMA actuator wire arrangement in different confirmations according to a third embodiment of the present invention.

FIG. 4A shows a side view of a wiring arrangement in an SMA actuator 410 according to a third embodiment of the present invention. The SMA actuator 410 is structurally and functionally similar to the SMA actuator 310 of FIG. 3A. For example, the SMA wire 402 is supported by and fixedly attached to an end of a flexure 422, with a first portion 402a attached to the support structure 411 and a second portion 402b attached to the moveable part 413. Whilst FIG. 4A only shows a single SMA wire 402 and some of the key components, other components such as a second SMA wire nevertheless present.

The SMA actuator 410 differs from the second embodiment 310 in that the flexures 422 extend at an angle to the optical axis. Such an arrangement may allow the movement, or stroke, of the moveable part 413 to be amplified. The degree of amplification depends on the relative orientation between the flexure arm 422 and the corresponding first portion of the SMA wire 402a, e.g. the portion that connects with the support structure.

Taking FIG. 4A as an example, flexure 422 is angled away from the optical axis in a direction towards the moveable part 413. As such the angle between the flexure 422 and the first portion of the SMA wire 402a, α, is an acute angle, and sharper than the obtuse angle β between the flexure 422 and the second portion of the SMA wire 402b.

Upon contraction, the first portion of the SMA wire 402a draws on the flexure 422 towards the support structure 411, which causes the end of the flexure 422 to rotate about and/or translate relative to its fixing point on the support component. This in turn leads to a change in the orientation of the first portion of the SMA wire 402a, thus contributing to an increased gearing. In fact, the sharper the angle α between the flexure and the first portion of the SMA wire 402a, the higher a gearing can be achieved with a given amount of wire contraction. Thus, it is demonstrated that the degree of stroke amplification may be fine-tuned by changing the orientation of the flexure 422 with respect to the first portion of the SMA wire 402a. However, if the angle α between the flexure and the first portion of the SMA wire 402a is reduced below a given limit, e.g. α<10°, the movement of the moveable part may become unstable or jittery.

Referring back to the second embodiment of FIG. 3, an acute angle can be observed between the first portion of the SMA wire 302a and the flexure 322. Thus, the second embodiment of FIG. 3 also produces a degree of stroke amplification during use.

Figure 4B:
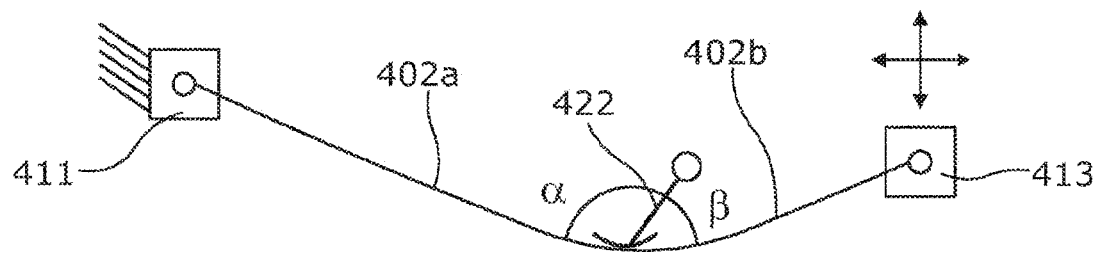

On the other hand, the stroke of the actuator 410 may be shortened by reducing its gearing. For example, as shown in FIG. 4B, the flexure 422 is orientated away from the moveable part. That is, the angle between the flexure 422 and the first portion of the SMA wire 402a, α, becomes an obtuse angle, and is shallower than the acute angle β between the flexure 422 and the second portion of the SMA wire 402b. In this arrangement, the amount of rotation and/or translation in the flexure 422 significantly reduced, and thus the change in the orientation of the first portion of the SMA wire 402a reduces accordingly. Accordingly, such an arrangement reduces the gearing, and thus the stroke of the SMA actuator 410. For example, in an extreme case where the flexure 422 is arranged in line with the first portion of SMA wire, e.g. α=90°, the movement of the movable part may be equal to the amount of contraction in the SMA wire. That is, in such as arrangement there will be substantially no amplification. In some applications, a reduced amplification in the stroke, e.g. α>90°, may be desirable because it provides a more precise and stable movement control, and an increased force.

As shown, the amplification of movement stroke may be predefined to suit the application. That is, the actuator 410 can be manufactured with a flexure 422 that is oriented at a predetermined angle α to the first portion of the SMA wire 402a.

In some other embodiments, the flexure 422 may be rotatably attached to the support component 420 at the fixing point such that the degree of amplification can be varied during use. That is, the flexure 422 may be adjustably pivotable to various positions, so as to achieve variable amplification in the stroke. For example, the flexure 422 may be connected to the support component 420 with a lockable pivot such that the orientation of the flexure 422 may be adjusted when the lockable pivot is put into an unlocked position.

The lockable pivot may be controlled and/or actuated mechanically or electronically by a controller, in order to vary the stroke amplification to suit different operating modes. For example, a smaller degree of stroke amplification may be used during normal operation because the demand for OIS is relatively low. However, when the electronic device is subject to a higher level of vibration or shake, for example when used during a sporting event, the stroke amplification may increase accordingly to satisfy a higher demand in OIS. Moreover, such an arrangement may allow available stroke to distribute or to be allocated between two perpendicular axes to suit different functions, e.g. OIS in the X-Y plane and AF in the Z axis.

In summary, stroke amplification may be achieved by:
1. Amplification of the motion generated by the wire through controlling the direction of motion, or through rotation, of an intermediate component (e.g. a flexure body or moveable portion).

2. Increasing the wire length through changing the direction of the force and motion generated by the wire to allow the motion generated by two regions of wire to be added while keeping the mechanism within the desired size (e.g. a roller or a hook).

Figure 5:
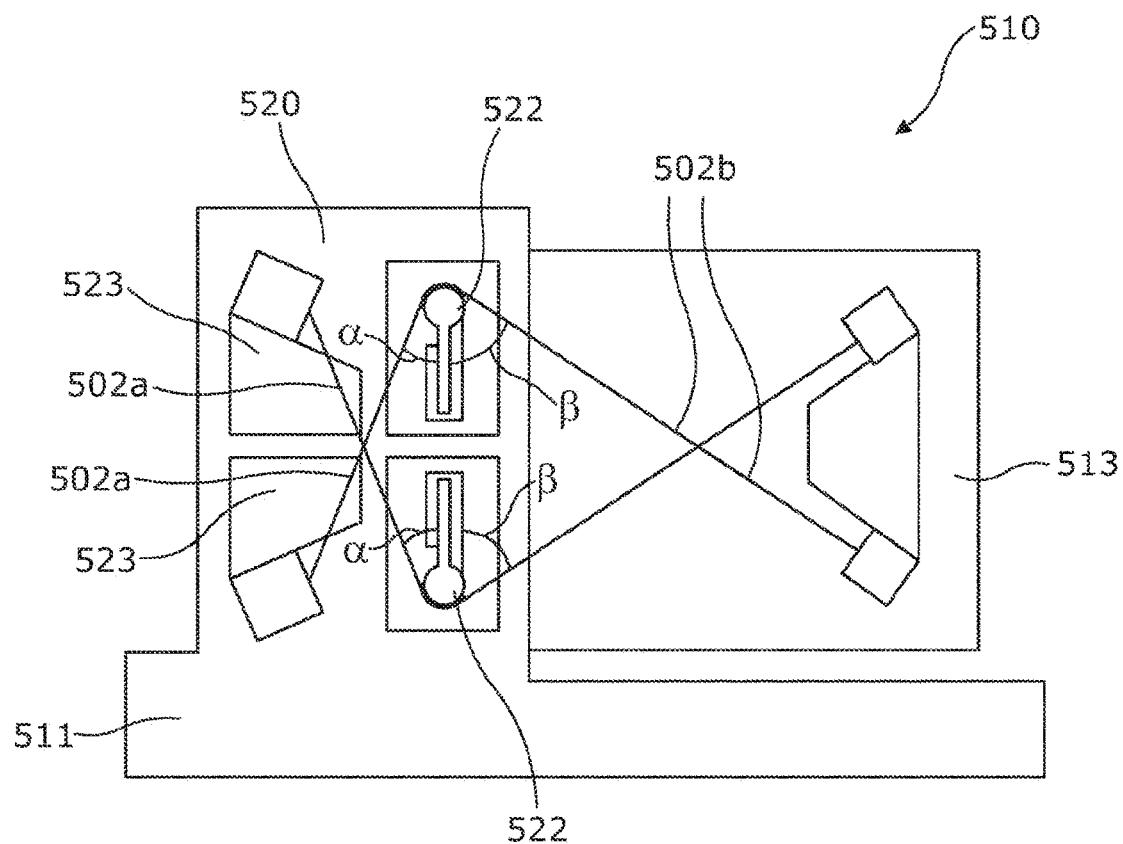
FIG. 5 is a side view of an SMA actuator according to a fourth embodiment of the present invention.

FIG. 5 shows a side view of an SMA actuator 510 according to a fourth embodiment of the present invention. As viewed from the side of the actuator 510, there is provided a pair of SMA wires 502 connecting the moveable part 513 and the support structure 511. In this embodiment, a first portion of the SMA wire 502 is arranged at a sharp angle, a, to the flexure 522 in order to provide a greater degree of stroke amplification.

Similarly to the third embodiment of FIG. 4A, it is shown that a pair of SMA wires 502 is supported, or interfered, by respective ends of flexures 522. The flexures may be adjustably rotated about the support component 520. In this embodiment, the first portions of the SMA wires 502a cross each other when viewed from the side of the actuator 502, which results in a reduced footprint. However, in other embodiments, the first or second portions of the pair of the SMA wires 502 may extend in parallel to each other and substantially in a direction perpendicular to the optical axis, in a similar manner to the first embodiment as shown in FIG. 2.

In contrast to the earlier embodiments, the support component 520 comprises crimps 523 for attaching a first portion of the SMA wire 502a, as well as flexures 522 for supporting the SMA wire 502. In this embodiment, the flexures 522 are positioned closer to the crimps 523 on the support structure 511 than to the crimps that are mounted on the moveable part 513. As a result, the first portions of the SMA wires 402a are shorter in length, as well as extending at a steeper gradient, than the second portion of the SMA wire 502b.

The flexures 522 extend along the optical axis and are compliant in a plane in which the SMA wires 502 extend. Thus, upon contraction, the movement in the SMA wires 502 compresses the flexures 522 and thereby deforms their respective flexure arms, causing the ends of the supports 522 to rotate about and/or translate relative to their fixing points.

In the illustrated embodiment, the flexures 522 are rotatably attached to the support component 520 at respective fixing points. The flexures 522 are adjustably pivotable to various positions, so as to achieve a variable amplification of displacement in the moveable part 513 in a similar manner to the third embodiment as shown in FIGS. 4A and 4B.

As shown in FIG. 5, the first portion 502a and the second portion 502b of the SMA wire 502 are respectively inclined at angles $\alpha$ and $\beta$ to the optical axis O. In comparison to the second embodiment as shown in FIG. 3A, the first portion of the SMA wire 502a is inclined at a much steeper gradient and thus, such an arrangement may advantageously increase the stroke amplification of the actuator 510.

The embodiments as shown in FIGS. 2 to 5 rely on the use of a roller or a flexure to support lengths of SMA wires, resulting in two distinct and non-parallel portions of SMA wires. Advantageously, such an arrangement may allow a relatively long SMA wire to extend along substantially the full length/width of the actuator. In some other embodiments, however, a flexure arm may be provided in place of one of the two portions of the SMA wires, e.g. the second portion that is in connection with the moveable part. That is, the length of the SMA wires may be reduced accordingly to accommodate the additional flexure arm. However, such an arrangement does not necessarily reduce the achievable stroke, if a stroke amplification arrangement is employed.

Figure 6:
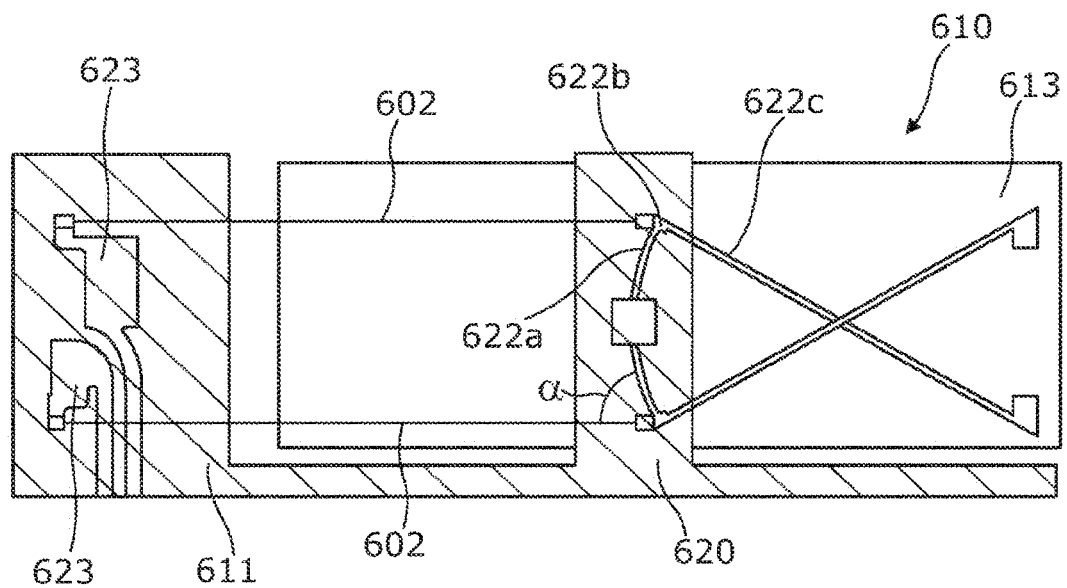
FIG. 6 is a side view of an SMA actuator according to a fifth embodiment of the present invention.
Figure 7:
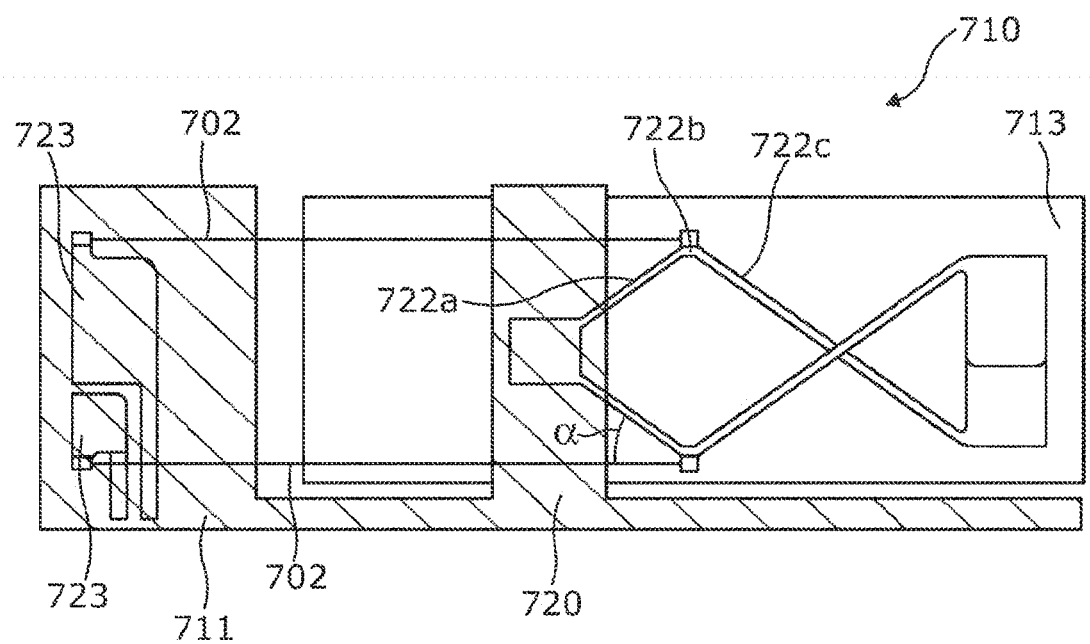
FIG. 7 is a side view of an SMA actuator according to a sixth embodiment of the present invention.

FIGS. 6 and 7 respectively show side views of SMA actuators 610, 710 according to a fifth embodiment and a sixth embodiment of the present invention. Referring to the side view of FIG. 6, there is provided a pair of parallelly extending SMA wires 602 connecting between a support structure 611 and a flexure arrangement (an example of a force-modifying mechanism) 622. However, in other embodiments, the pair of SMA wires 602 may cross each other when viewed from the side, in a similar manner to the arrangement as shown in FIG. 2 in order to reduce the footprint of the actuator.

The flexure arrangement 622 comprises a first flexure arm (e.g. force-modifying flexure) 622a extending between a fixing point on a support component 620 and a connector (e.g. moveable portion) 622b of the flexure arrangement (e.g. force-modifying mechanism) 622. Effectively, the first flexure arm 622a and the connector 622b are equivalent to the various flexures 322, 422, 522 as shown in FIGS. 3, 4, and 5.

The flexure arrangement 622 further comprises a second flexure arm (an example of a coupling link) 622c connected between the moveable part 613 and the connector 622b. More specifically, the second flexure arms 622c replace the second portions of the SMA wires in the previous embodiments and are tasked with converting force from the SMA wires 602 to movement of the moveable part 613. The second flexure arms 622c are each inclined relative to the optical axis O, optionally at an angle greater than the "minimum wire angle" as defined above.

In the illustrated embodiment, both the first flexure arm 622a and the second flexure arm 622c are flexible and/or elastically deformable, and compliant only in the plane in which the SMA wires 602 extend. This may allow the moveable part to return to a default position, as well as maintaining the tension in the SMA wires 602 when they are not energised. In some other embodiments, the first flexure arm 622a and/or second flexure arm 622c may be replaced by a pivoting rigid member that does not deform during use.

Unlike the second portion of the SMA wire in earlier embodiments, the second flexure arms 622c do not contract during use and thus they do not contribute to the overall displacement/stroke of the moveable part. To ensure sufficient achievable stroke, the first flexure arms 622a each extend from the support component 620 at an acute angle relative to the optical axis O, and towards the moveable part 613. More specifically, such an arrangement requires a sharper angle $\alpha$ between the first flexure arms 622a and their respective SMA wires 602.

Upon contraction, the SMA wire 602 draws on first flexure arm 622a towards the support structure 611, which causes the connector 622b to rotate about and/or translate relative to its fixing point on the support component 620. This in turn leads to a change in the orientation of the SMA wire 602 and contributes to an increased gearing. As with the earlier embodiments, the sharper the angle $\alpha$ between the first flexure arms 622a and the SMA wire 602, the higher gearing can be achieved with a given amount of wire contraction. For example, by having a smaller angle $\alpha$ between the first flexure arms 722a and the SMA wire 702, the actuator 710 according to the sixth embodiment as shown in FIG. 7 can achieve a greater stroke.

Figure 8:
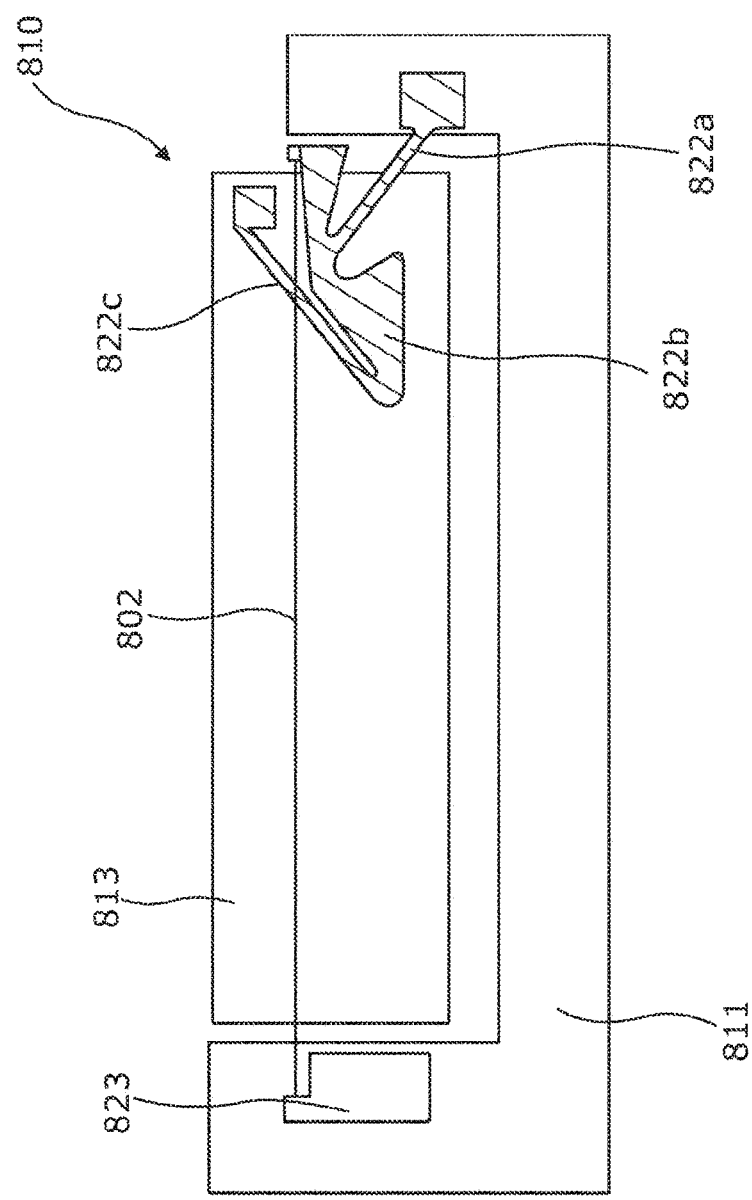
FIG. 8 is a side view of an SMA actuator according to a seventh embodiment of the present invention.

There are numerous variations of the flexures 622 and 722 that each work according to the same principle. For example, FIG. 8 shows a side view of an SMA actuator 810 according to a seventh embodiment of the present invention. Similar to the fifth and sixth embodiments of FIGS. 6 and 7, the SMA actuator 810 comprises a support structure 811 and a moveable part 813 moveable relative to the support suture 811, as well as an SMA wire extending orthogonally to the optical axis. The SMA wire having a first end attached to the support structure and a second end attached to a flexure body (movable body) 822*b* of a flexure arrangement 822. The flexure arrangement 822 also comprises a first flexure arm 822*a* and a second flexure arm 822*b* respectively attached to the support structure 811 and the moveable part 813.

Despite their difference in appearance, the flexure arrangement 822 works according to the same principle as the flexure arrangements 622, 722 as used in the previous embodiments. That is, because the flexure body 822*b* is anchored to the support structure 811, upon contraction, the laterally extending SMA wire 802 causes the first flexure arm 822*a* to bend, and the flexure body 822*b* to rotate (in an anti-clockwise direction as shown in FIG. 8). Such rotation increases travel in the second flexure arm 822*c* and thus drives an amplified movement in the moveable part.

Advantageously, the second flexure arm 822*c* as shown in FIG. 8 is positioned in line with the flexure body 822*b*, thus allowing the laterally extending SMA wire 802 to span across the entire length of the moveable part 813 and thereby further increasing the available stroke.

FIGS. 6 to 8 depict embodiments in which the force-modifying mechanism is embodied by a force-modifying flexure, and the coupling link is embodied by a flexure arm. In general, however, the force-modifying mechanism may be embodied by any mechanism capable of amplifying the displacement or force applied on the force-modifying mechanism by an SMA wire. The force-modifying mechanism may, for example, comprise a flexure, a lever arm, or a roller. Similarly, the coupling link may be embodied by any element or arrangement capable of fulfilling the dual function of transferring an actuating force to the second part (movable part) and providing compliance in a direction perpendicular to the direction of the actuating force.

Figure 9A:
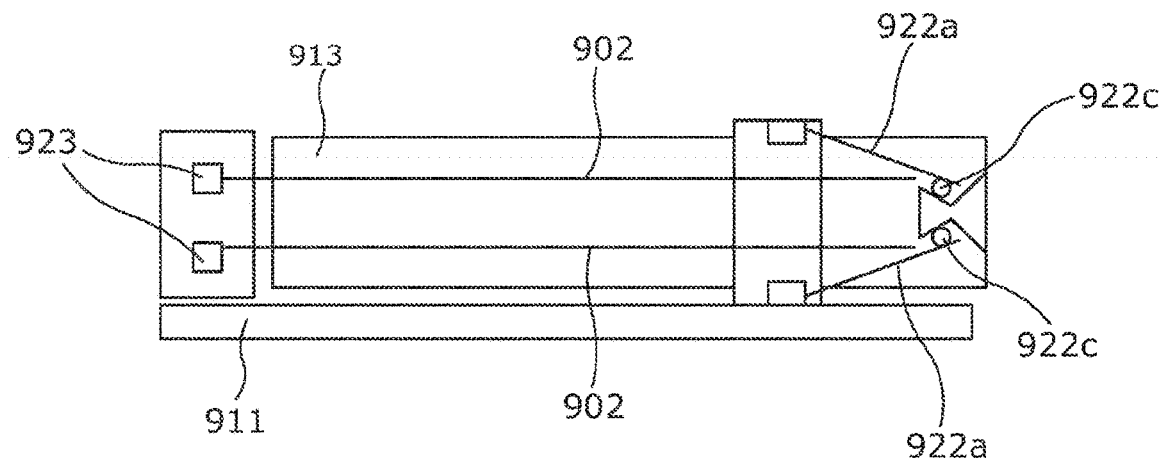
FIGS. 9a and 9b are side view of an SMA actuator according to eighth and ninth embodiment of the present invention, respectively.
Figure 9B:
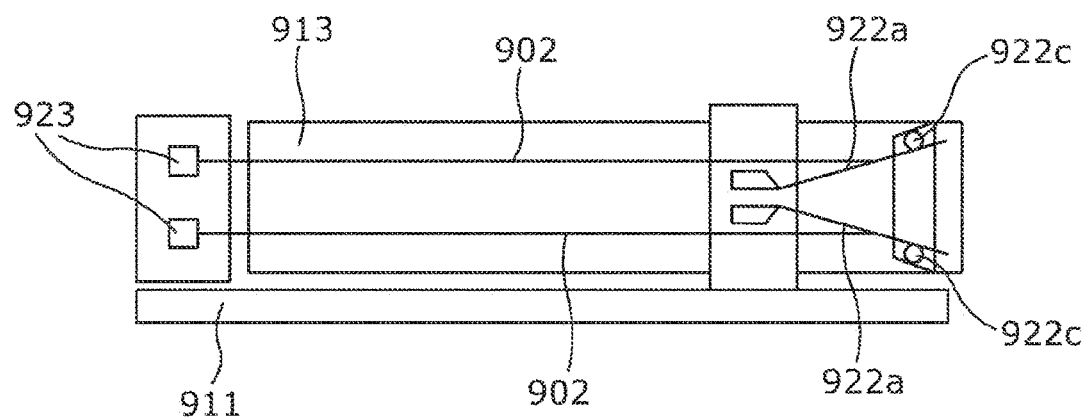

FIGS. 9A and 9B depict embodiments in which the coupling link comprises a rolling bearing 922*c* instead of a flexure, for example. Upon contraction of the SMA wire 902, the SMA wire 903 applied an input force to the force-modifying flexure 922*a*. The force-modifying flexure 922*a* modifies the input force, in particular reduces the input force and increases the stroke of the SMA wire 902 in the depicted embodiment, and provides an output force to the rolling bearing 922*c*. The rolling bearing 922*c* is held in compression, for example due to the tension in opposing SMA wires 902. The rolling bearing 922*c* transfers the output force so as to provide an actuating force for moving the second part 913 (i.e. the movable part) relative to the first part 911 (i.e. the support structure).

The difference between the embodiments of FIGS. 9A and 9B arises from the arrangement of the force-modifying flexures 922*a* and the rolling bearings 922*c*. In FIG. 9A, contraction of the top SMA wire 902 is redirected by the force-modifying flexure 922*a* in the down-left direction, so as to apply an actuating force on the second part 913 in the down-left direction. Contraction of the bottom SMA wire 902 is redirected by the force-modifying flexure 922*a* in the top-left direction, so as to apply an actuating force on the second part 913 in the top-left direction. In FIG. 9B, this arrangement is the other way around, such that contraction of the top SMA wire 902 results in an actuating force in the top-left direction and contraction of the bottom SMA wire 902 results in an actuating force in the bottom-left direction.

Furthermore, in FIGS. 9A and 9B, the distance on the force-modifying flexure between its connection point to the first part 911 (i.e. support structure) and the connection to the SMA wire 902 is less than the distance between its connection point to the first part 911 (i.e. support structure) and the connection to the coupling link (embodied by the rolling bearing 922*c*). This further contributes to stroke amplification. In general, the force-modifying mechanism in any of the preceding embodiments may achieve stroke or force amplification due to the relative positioning of the connection to the SMA wire and the connection to the coupling link, in addition to or as an alternative to stroke or force amplification due to the angling of the force-modifying mechanism relative to the input force provided by the SMA wire and the output force provided or the coupling mechanism.

Figure 10:
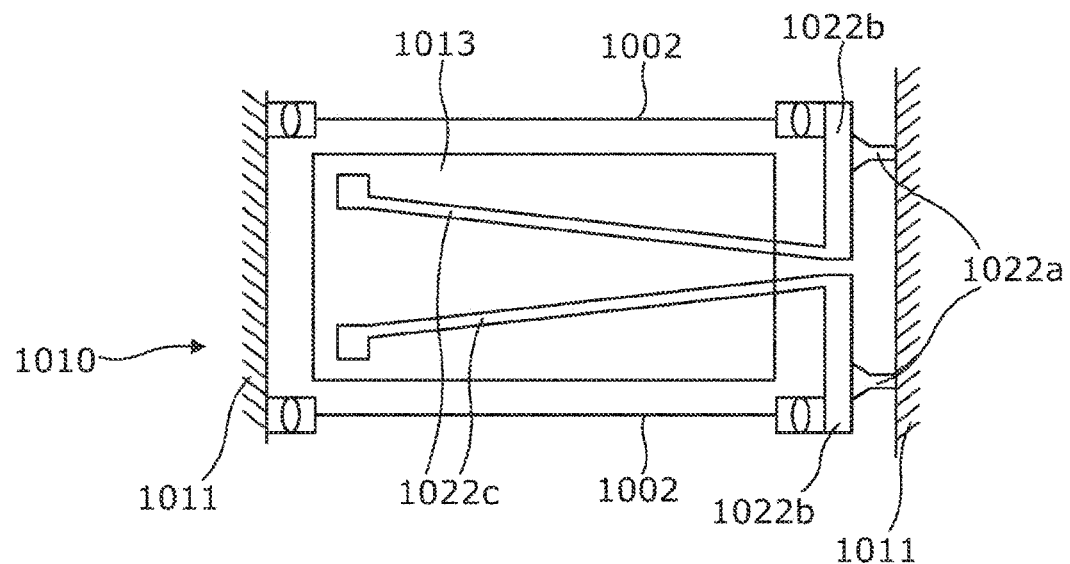
FIG. 10 is a side view of an SMA actuator according to a tenth embodiment of the present invention.

FIG. 10 depicts a tenth embodiment of an SMA actuator 1010 which is similar to the fifth embodiment depicted in FIG. 6, except for the following main differences.

In the fifth embodiment, each of the force-modifying flexures 622*a* is connected to a fixing point on a support component 620 which is positioned part-way along a side of the SMA actuator 610. In contrast, in the tenth embodiment, each of the force-modifying flexures 1022*a* is connected to a fixing point (e.g. on the support structure 1011) which is positioned at or near a corner of the SMA actuator 1010. Each of the moveable portions 1022*b* is connected to the support structure 1011 via a force-modifying flexure 1022*a* and so is also positioned at or near a corner. Accordingly, each of the SMA wires 1002 can extend along substantially all (e.g. >80%) of the length of the side. Thus, longer SMA wires 1002 (which are generally capable of producing larger movements) can be accommodated in an SMA actuator of a given lateral size. In each actuating unit of the fifth embodiment, the coupling link 622*c* and the SMA wire 602 extend from the moveable portion 602*b* in roughly opposite directions (and connect to the support structure 611 and the moveable part 613, respectively, at or near different corners of the SMA actuator 610). In contrast, in each actuating unit of the tenth embodiment, the coupling link 1022*c* and the SMA wire 1002 extend from the moveable portion 1022*b* in roughly the same direction along the side (and connect to the support structure 1011 and the moveable part 1013, respectively, at or near the same corner of the SMA actuator 610). Hence, for tension in the SMA wire 1002 to produce tension in the coupling link 1022*c*, the force-modifying flexure 1022*a* should be connected to a point on the moveable portion 1022*b* that is between the points at which the coupling link 1022*c* and the SMA wire 1002 are connected.

In this example, in each actuating unit, the SMA wire 1002 is located towards the top or bottom (as the case may be) of the SMA actuator 1010, and the coupling link 1022*c* is located towards the middle of the SMA actuator 1010. In each actuating unit, the SMA wire 1002 may have any suitable location along the primary axis and the coupling link 1022*c* may have any suitable location along the primary axis and inclination with respect to the primary axis (e.g. extending upwards or downwards from the moveable portion 1022*b*). The two actuating units on each side may be separated from each other along the primary axis, or they may overlap.

Figure 11:
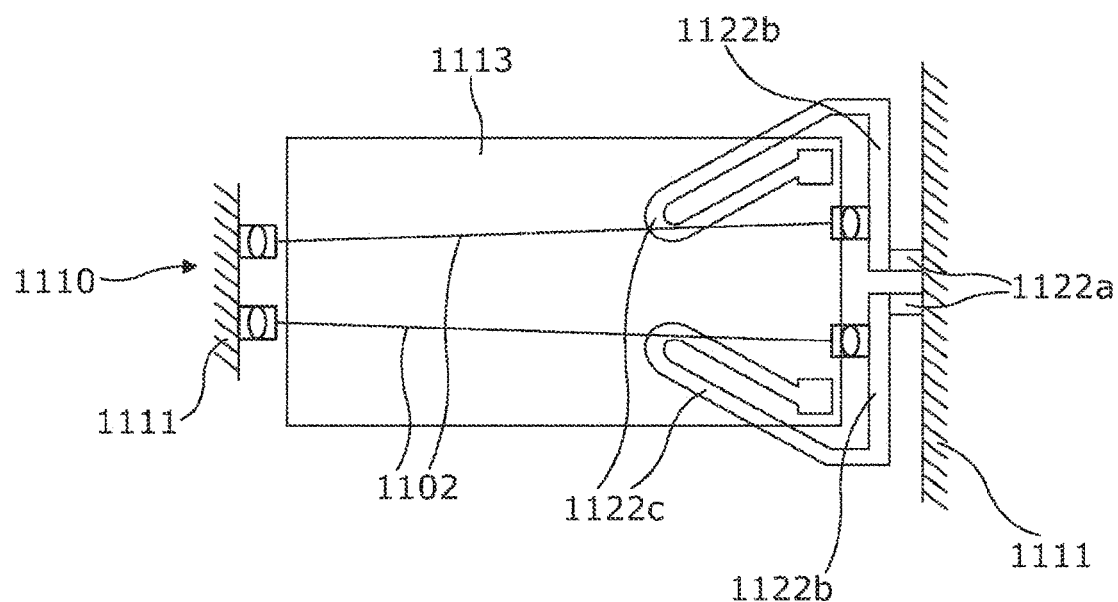
FIG. 11 is a side view of an SMA actuator according to an eleventh embodiment of the present invention.

FIG. 11 depicts an eleventh embodiment of an SMA actuator 1110 which is similar to the tenth embodiment depicted in FIG. 10, except for the following main differences.

In the eleventh embodiment, each of the coupling links 1122*c* includes a hairpin such that the coupling link 1122*c* has a first portion which extends from the moveable portion 1122*b* in a first direction to the hairpin and then a second portion which extends from the hairpin in a second direction (substantially opposite to the first direction) before connecting to the moveable part 1113. Hence, in each actuating unit, the SMA wire 1102 and the coupling link 1122*c* connect to the support structure 1111 and the moveable part 1113, respectively, at or near different corners of the SMA actuator 1110.

In each actuating unit of the eleventh embodiment, the second part of the coupling link 1122*c* is under tension when the SMA wire 1102 is under tension, and the connection points of the relevant components 1102, 1122*a*, 1122*c* to the moveable part 1122*b* are arranged accordingly. However, in other examples, the actuating unit may be configured differently.

In other examples, the coupling links 1122*c* may have more complex shapes.

Figure 12:
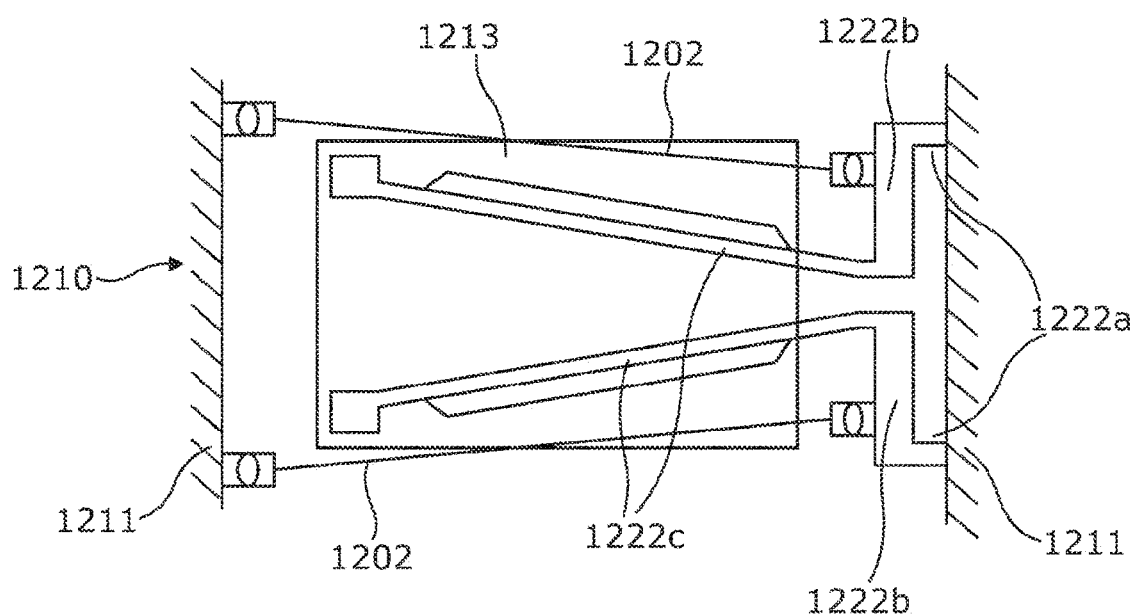
FIG. 12 is a side view of an SMA actuator according to a twelfth embodiment of the present invention.

FIG. 12 depicts a twelfth embodiment of an SMA actuator 1210 which is similar to the tenth embodiment depicted in FIG. 10, except for the following main differences.

In each actuating unit of the tenth embodiment, when the SMA wire 1002 is in tension, the coupling link 1022*c* is in tension. In contrast, in each actuating unit of the twelfth embodiment, when the SMA wire 1202 is in tension, the coupling link 1222*c* is in compression.

Accordingly, in the twelfth embodiment, each of the coupling links 1222*c* may be provided with additional features to increase its strength in compression, such as an L-shaped cross-section. As will be appreciated, such additional features should not unduly affect the compliance of the coupling link 1222*c* in directions perpendicular to its length. In some examples, there may be no such additional features.

In the twelfth embodiment, for a stroke-amplifying effect, the SMA wire 1202 is connected to a point on the moveable portion 1222*b* that is between the points at which the force-modifying flexure 1222*a* and the coupling link 1222*c* are connected.

The above-described SMA actuator assemblies comprise an SMA wire. The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

The invention claimed is:

1. A shape memory alloy (SMA) actuator assembly comprising:
    first and second parts that are moveable relative to each other; and
    one or more actuating units, each actuating unit comprising:
        a force-modifying mechanism connected to the first part;
        a coupling link connected between the force-modifying mechanism and the second part; and
        an SMA wire connected between the first part and the force-modifying mechanism for applying an input force on the force-modifying mechanism thereby causing the force-modifying mechanism to apply an output force on the coupling link and causing the coupling link to apply an actuating force on the second part, wherein:
            the coupling link is compliant in a direction perpendicular to the direction of the actuating force; and
            the one or more actuating units are arranged to drive movement of the second part relative to the first part at least along a primary axis along which the shortest side of the SMA actuator assembly extends.

2. An SMA actuator assembly according to claim 1, wherein the SMA wire is arranged at a non-zero angle to the primary axis.

3. An SMA actuator assembly according to claim 1, wherein the force-modifying mechanism is configured such that, in response to a change in length of the SMA wire, an end of the SMA wire that is connected to the force-modifying mechanism moves relative to the first part by a first distance, and an end of the coupling link that is connected to the force-modifying mechanism moves relative to the first part by a second distance that is greater than the first distance.

4. An SMA actuator assembly according to claim 1, wherein the force-modifying mechanism is configured such that, in response to a change in length of the SMA wire, an end of the coupling link that is connected to the force-modifying mechanism moves relative to the first part by a second distance that is greater than the change in length of the SMA wire.

5. An SMA assembly according to claim 1, wherein:
    the coupling link is a flexure; and
    the flexure is elongate and is stiff along its length and compliant in a direction perpendicular to its length.

6. An SMA assembly according to claim 1, wherein the coupling link comprises a ball bearing or a plain bearing.

7. An SMA actuator assembly according to claim 1, wherein the force-modifying mechanism comprises:
    a moveable portion to which the SMA wire and the coupling link are connected; and
    a force-modifying flexure connected between the moveable portion and the first part and configured to bend in response to the input force.

8. An SMA actuator assembly according to claim 7, wherein at least one of the coupling link and force-modifying flexure is configured to have a lower stiffness in a direction along the primary axis than any other direction to facilitate movement of the moveable portion.

9. An SMA actuator assembly according to claim 7, wherein the moveable portion is integrally formed with the force-modifying flexure and/or the coupling link.

10. An SMA actuator assembly according to claim 7, wherein the force-modifying flexure is elongate and is stiff along its length and compliant in a direction perpendicular to its length.

11. An SMA actuator assembly according to claim 1, wherein the at least one SMA wire comprises a first SMA wire and a second SMA wire configured to drive movement of the second part in a first direction and a second direction opposite to the first direction.

12. An SMA actuator assembly according to claim 1, wherein:
the at least one SMA wire comprises four pairs of SMA wires; and
the four pairs of SMA wires are arranged with two-fold symmetry around the primary axis.

13. An SMA actuator assembly according to claim 1, wherein:
the second part comprises one or more lenses or an image sensor; and
the primary axis is an optical axis of the one or more lenses or is perpendicular to a light-sensitive region of the image sensor.

14. A shape memory alloy (SMA) actuator assembly comprising:
a support structure;
a moveable part moveable relative to the support structure;
at least one SMA wire having a first portion and a second portion respectively attached to the support structure and the moveable part, the said SMA wire is configured to, on contraction, drive movement in the moveable part at least along a primary axis along which the shortest side of the SMA actuator assembly extends; and
an intermediate component engaging the SMA wire at a location between the first and second portions, the second portion of the SMA wire being arranged at an oblique angle to both the primary axis and the first portion of the SMA wire.

15. An SMA actuator assembly according to claim 14, wherein the second portion extends at a smaller angle than that of the first portion with respect to the primary axis.

16. An SMA actuator assembly according to claim 14, wherein the extent of the second portion is greater than that of the first portion along the primary axis.

17. An SMA actuator assembly according to claim 14, the said SMA wire is further configured to, on contraction, drive movement in the moveable part in a direction perpendicular to the primary axis.

18. An SMA actuator assembly according to claim 14, the intermediate component comprises a flexure for engaging the SMA wire, where in the flexure is compliant in a plane in which the SMA wire extends.

19. An SMA actuator assembly according to claim 18, wherein the extent of contraction in the SMA wire is substantially less than a corresponding displacement of the moveable part.

20. An SMA actuator assembly according to claim 14, wherein the first and second portions of the SMA wire are coupled to each other such that, when the SMA wire is driven, contraction of the first portion causes a displacement of the second portion that provides a contribution to movement of the moveable part that is in addition to the contribution provided by contraction of the second portion.

* * * * *